United States Patent
Ono et al.

(10) Patent No.: US 9,403,535 B2
(45) Date of Patent: Aug. 2, 2016

(54) VEHICLE CONTROL DEVICE AND VEHICLE CONTROL METHOD

(71) Applicant: NISSAN MOTOR CO., LTD., Yokohama-shi, Kanagawa (JP)

(72) Inventors: Masashi Ono, Sagamihara (JP); Takahiro Yoshino, Yokosuka (JP); Masahiro Iriyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/429,107

(22) PCT Filed: Jul. 19, 2013

(86) PCT No.: PCT/JP2013/069631
§ 371 (c)(1),
(2) Date: Mar. 18, 2015

(87) PCT Pub. No.: WO2014/045698
PCT Pub. Date: Mar. 27, 2014

(65) Prior Publication Data
US 2015/0217772 A1    Aug. 6, 2015

(30) Foreign Application Priority Data

Sep. 19, 2012   (JP) ................................. 2012-205879

(51) Int. Cl.
| | |
|---|---|
| *F16H 61/662* | (2006.01) |
| *B60W 30/188* | (2012.01) |
| *F02D 41/02* | (2006.01) |
| *F02D 41/10* | (2006.01) |
| *F02D 41/14* | (2006.01) |
| *B60W 10/06* | (2006.01) |
| *B60W 10/107* | (2012.01) |
| *B60W 30/19* | (2012.01) |
| *F02D 45/00* | (2006.01) |
| *F02D 29/00* | (2006.01) |

(52) U.S. Cl.
CPC ........... *B60W 30/1882* (2013.01); *B60W 10/06* (2013.01); *B60W 10/107* (2013.01); *B60W 30/19* (2013.01); *F02D 41/023* (2013.01); *F02D 41/0225* (2013.01); *F02D 41/10* (2013.01); *F02D 41/1497* (2013.01); *F02D 45/00* (2013.01); *F16H 61/66259* (2013.01); *F16H 61/66272* (2013.01); *B60W 2510/1005* (2013.01); *B60W 2510/105* (2013.01); *B60W 2510/106* (2013.01); *B60W 2710/0666* (2013.01); *F02D 29/00* (2013.01); *F02D 2200/101* (2013.01); *F02D 2200/501* (2013.01); *F02D 2250/18* (2013.01); *F02D 2250/21* (2013.01); *F02D 2400/12* (2013.01)

(58) Field of Classification Search
None
See application file for complete search history.

(56) References Cited

U.S. PATENT DOCUMENTS

| | | | | |
|---|---|---|---|---|
| 5,323,318 A * | 6/1994 | Hasegawa | ............. | F16H 1/0213 192/219 |
| 6,063,003 A * | 5/2000 | Kubota | ................. | B60W 10/06 477/43 |
| 6,063,004 A * | 5/2000 | Ibamoto | ............ | F16H 61/66254 477/40 |
| 6,141,615 A * | 10/2000 | Saito | .................... | F16H 61/0213 123/319 |
| 6,146,308 A * | 11/2000 | Taniguchi | ............. | F16H 37/022 475/211 |
| 6,389,348 B1 | 5/2002 | Takagi et al. | | |
| 6,973,379 B2 * | 12/2005 | Yamaguchi | ....... | F16H 61/66272 477/45 |
| 7,917,277 B2 * | 3/2011 | Tabata | ................... | B60K 6/445 180/65.21 |
| 2011/0208394 A1 | 8/2011 | Kuwahara et al. | | |

FOREIGN PATENT DOCUMENTS

| | | |
|---|---|---|
| JO | 2004-001761 A | 1/2004 |
| JP | 05-332426 A | 12/1993 |
| JP | 2008-163883 A | 7/2008 |
| WO | WO 2010/055554 A1 | 5/2010 |

* cited by examiner

*Primary Examiner* — Dirk Wright
(74) *Attorney, Agent, or Firm* — Foley & Lardner LLP (57) ABSTRACT

A vehicle control device includes a target drive force setting unit configured to set a target drive force based on an operating state, a target speed ratio setting unit configured to set a target speed ratio of a continuously variable transmission to achieve the target drive force and a target torque setting unit configured to set a target torque of a drive source to achieve the target drive force. The target drive force setting unit is configured to set a target drive force reduced in a stepwise manner at the time of upshifting in the continuously variable transmission.

13 Claims, 5 Drawing Sheets

VEHICLE CONTROL DEVICE AND VEHICLE CONTROL METHOD

TECHNICAL FIELD

The prevent invention relates to a vehicle control device and a vehicle control method.

BACKGROUND ART

Conventionally, a control device for changing a speed ratio of a continuously variable transmission in a stepwise manner to increase a vehicle speed while repeating a gradual increase and a sudden decrease of an engine rotation speed when a vehicle is determined to be in a sudden acceleration requesting state according to an operated amount of an accelerator pedal is disclosed in JP5-332426A.

SUMMARY OF INVENTION

Using the above invention, it is considered to control a continuously variable transmission by setting a target drive force according to an operating state of a vehicle and setting a target engine rotation speed and a target engine torque based on the target drive force. In the vehicle including this continuously variable transmission, a speed ratio of the continuously variable transmission is controlled to achieve a target input rotation speed corresponding to the target engine rotation speed and an engine is controlled to achieve the target engine torque.

In such a vehicle, a drive force which is reduced by a drop in the target engine rotation speed (target input rotation speed) is compensated by increasing the target engine torque when an accelerator pedal is depressed and the continuously variable transmission is upshifted. However, there are cases where a marginal torque is insufficient and an actual engine torque cannot be increased to the target engine torque even if it is actually attempted to increase the engine torque. This causes a problem that the actual drive force becomes smaller than the target drive force and drivability is deteriorated.

The present invention was developed to solve such a problem and aims to suppress a drive force shortage in the case of reducing a target engine rotation speed by upshifting and improve drivability.

A vehicle control device according to one aspect of the present invention includes a target drive force setting unit configured to set a target drive force based on an operating state, a target speed ratio setting unit configured to set a target speed ratio of a continuously variable transmission to achieve the target drive force and a target torque setting unit configured to set a target torque of a drive source to achieve the target drive force. The target drive force setting unit is configured to set the target drive force reduced in a stepwise manner at the time of upshifting in the continuously variable transmission.

DESCRIPTION OF EMBODIMENT

Hereinafter, an embodiment of the present invention is described with reference to the accompanying drawings.

Figure 1:
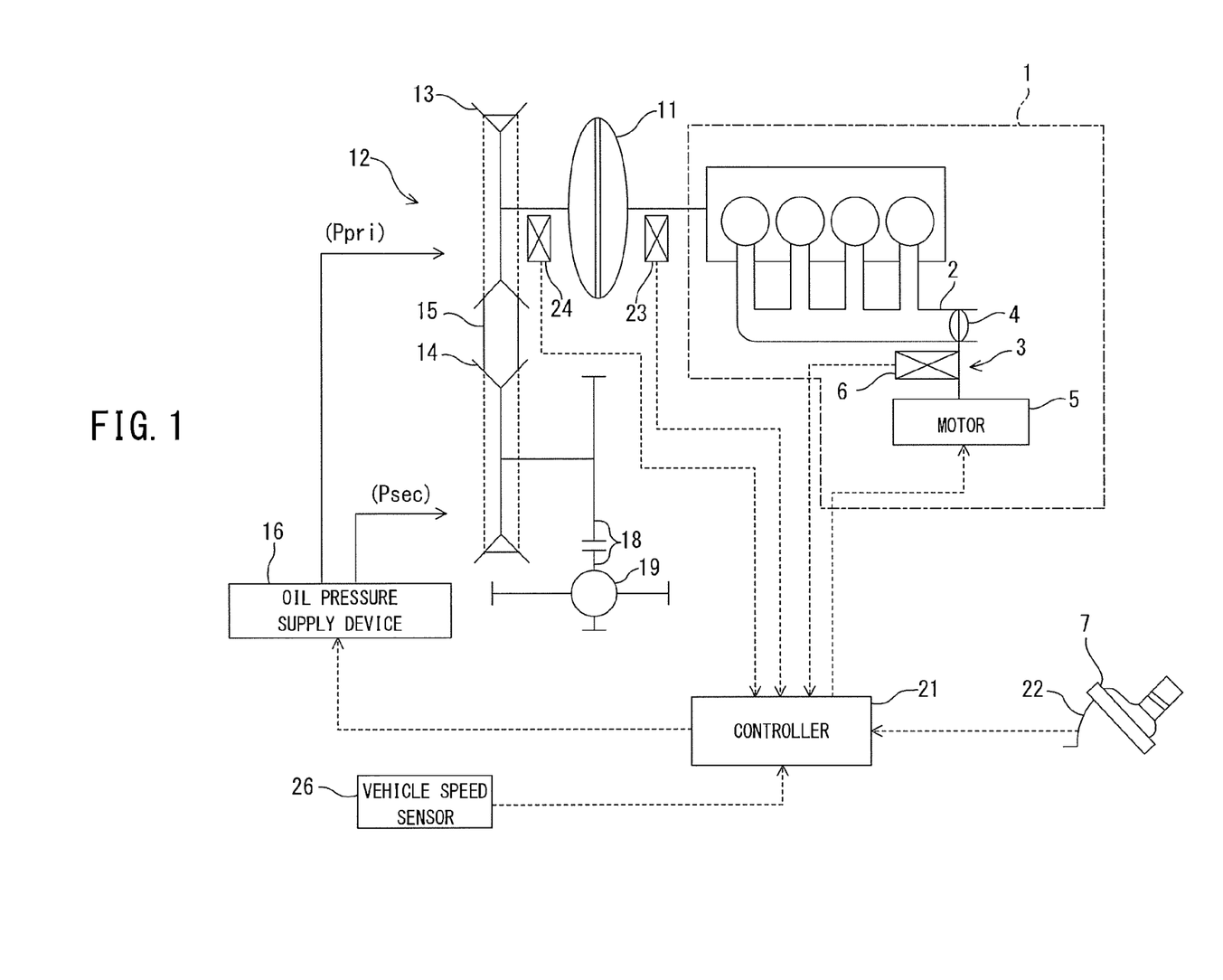
FIG. 1 is a schematic configuration diagram of a vehicle of an embodiment.

With reference to FIG. 1, an output of an internal combustion engine 1 of a vehicle is input to a continuously variable transmission 12 via a torque converter 11. The continuously variable transmission 12 includes a primary pulley 13, a secondary pulley 14 and a V-belt 15 mounted on these. The primary pulley 13 changes a radius of contact with the V-belt 15 by changing a groove width according to a hydraulic pressure Ppri. The secondary pulley 14 changes a radius of contact with the V-belt 15 by changing a groove width according to a hydraulic pressure Psec. As a result, the continuously variable transmission 12 continuously changes a ratio of an input rotation speed and an output rotation speed, i.e. a speed ratio according to controls of the hydraulic pressures Ppri and Psec. The hydraulic pressures Ppri and Psec are generated by a hydraulic pressure supply device 16.

The secondary pulley 14 is connected to drive wheels via a final gear 18 and a differential 19.

The internal combustion engine 1 includes an intake throttle device 3 for adjusting an intake air amount. The intake throttle device 3 includes an intake throttle 4 provided in an intake passage 2 of the internal combustion engine 1 and an electric motor 5 for changing an opening of the intake throttle 4 according to an input signal.

The hydraulic pressure supply device 16 and the intake throttle device 3 operate in response to a command signal output by a controller 21.

The controller 21 is configured by a microcomputer including a central processing unit (CPU), a read-only memory (ROM), a random access memory (RAM) and an input/output interface (I/O interface). It is also possible to configure the controller 21 by a plurality of microcomputers.

To the controller 21 are input, as signals, detection signals from a throttle opening sensor 6 for detecting a throttle opening of the intake throttle 4, an accelerator pedal opening sensor 22 for detecting an accelerator pedal opening of the accelerator pedal 7 provided in the vehicle, an engine rotation speed sensor 23 for detecting a rotation speed of the internal combustion engine 1, a primary pulley rotation speed sensor 24 for detecting a rotation speed of the primary pulley 13 and a vehicle speed sensor 26 for detecting a travel speed of the vehicle.

The controller 21 controls the drive force of the vehicle by controlling the opening of the intake throttle 4 and executing a shift control of the continuously variable transmission 12 via the hydraulic pressure supply device 16 in accordance with these detection signals.

Figure 2:
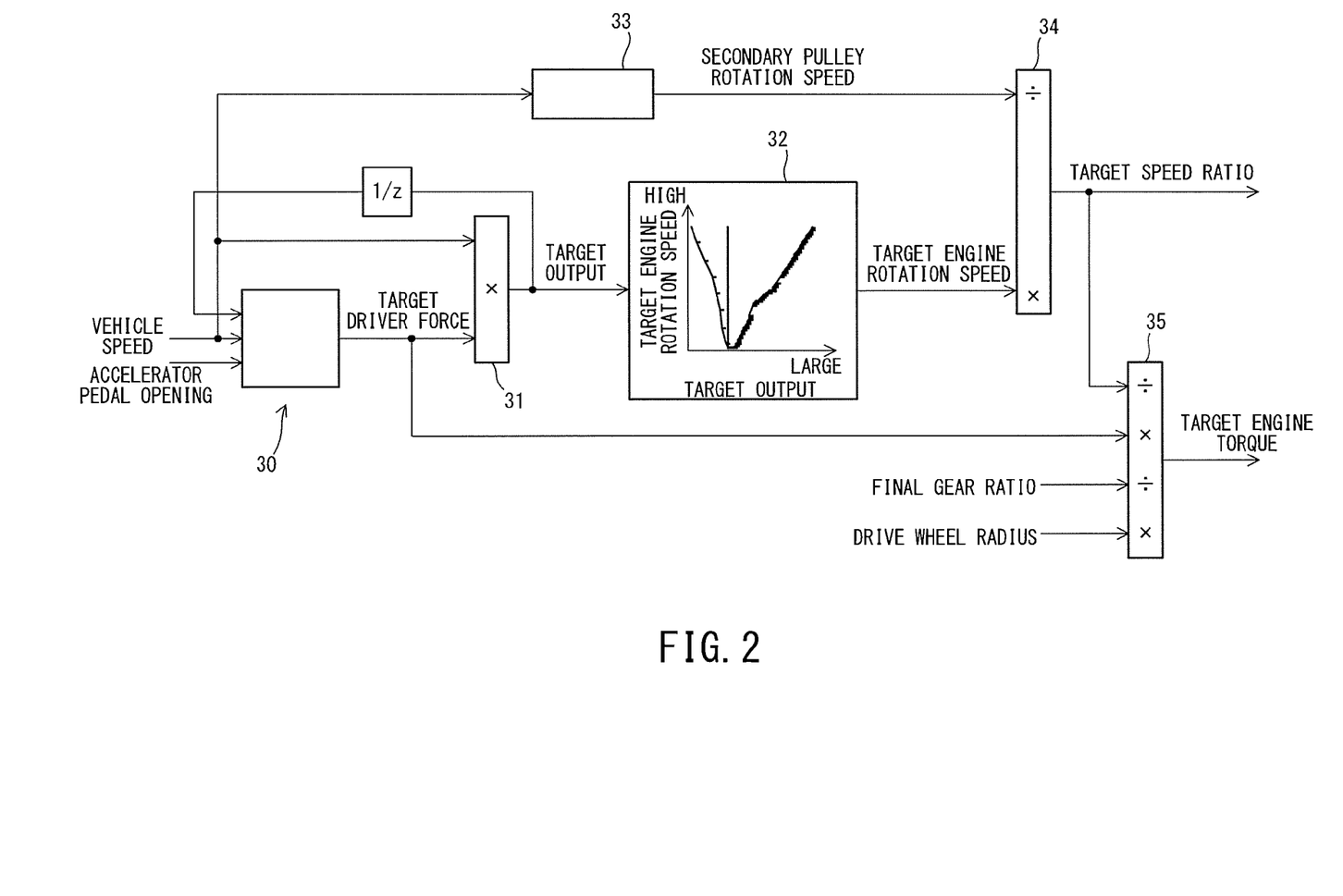
FIG. 2 is a control block diagram showing how to set a target speed ratio and a target engine torque of the embodiment.

Next, how to set a target speed ratio and a target engine torque of the present embodiment is described using a control block diagram of FIG. 2. A control described below is executed by the controller 21.

Although described in detail later, a target drive force setting unit 30 sets the target drive force based on a vehicle speed, an accelerator pedal opening and a target output.

A target output setting unit 31 sets the target output based on the target drive force and the current vehicle speed detected by the vehicle speed sensor 26.

Figure 3:
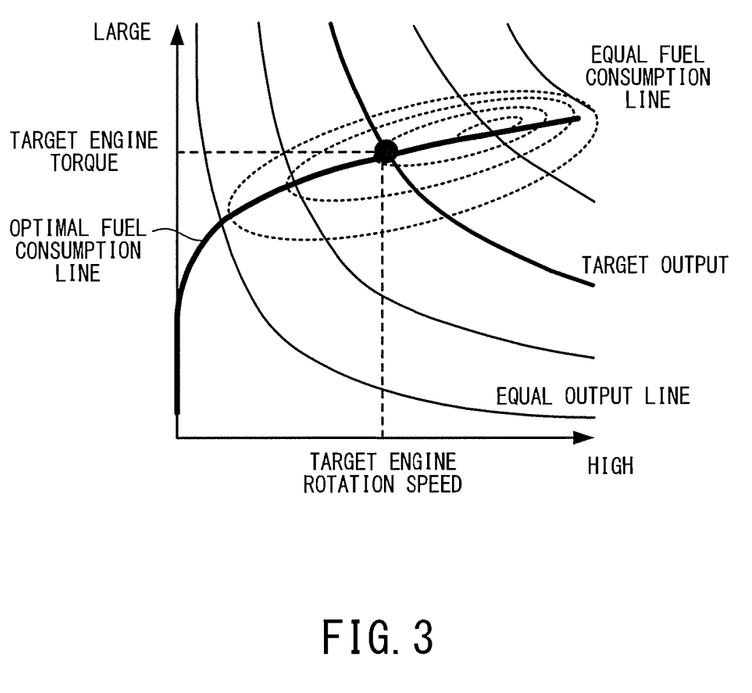
FIG. 3 is a map showing an optimal fuel consumption line.

The target engine rotation speed setting unit 32 sets a target engine rotation speed from a map based on the target output. The map used here is generated based on a map indicating an optimal fuel consumption line of FIG. 3 and the target engine rotation speed at which the internal combustion engine 1 is fuel-efficient is set based on the target output.

A target output rotation speed calculating unit 33 calculates a rotation speed of the secondary pulley 14 of the continuously variable transmission 12 based on the vehicle speed detected by the vehicle speed sensor 26.

A target speed ratio setting unit 34 sets a target speed ratio by dividing the target engine rotation speed by the rotation speed of the secondary pulley 14.

A target engine torque setting unit 35 sets a target engine torque by multiplying the target drive force and a radius of the drive wheels and dividing a multiplication value by the target speed ratio and a final gear ratio.

Figure 4:
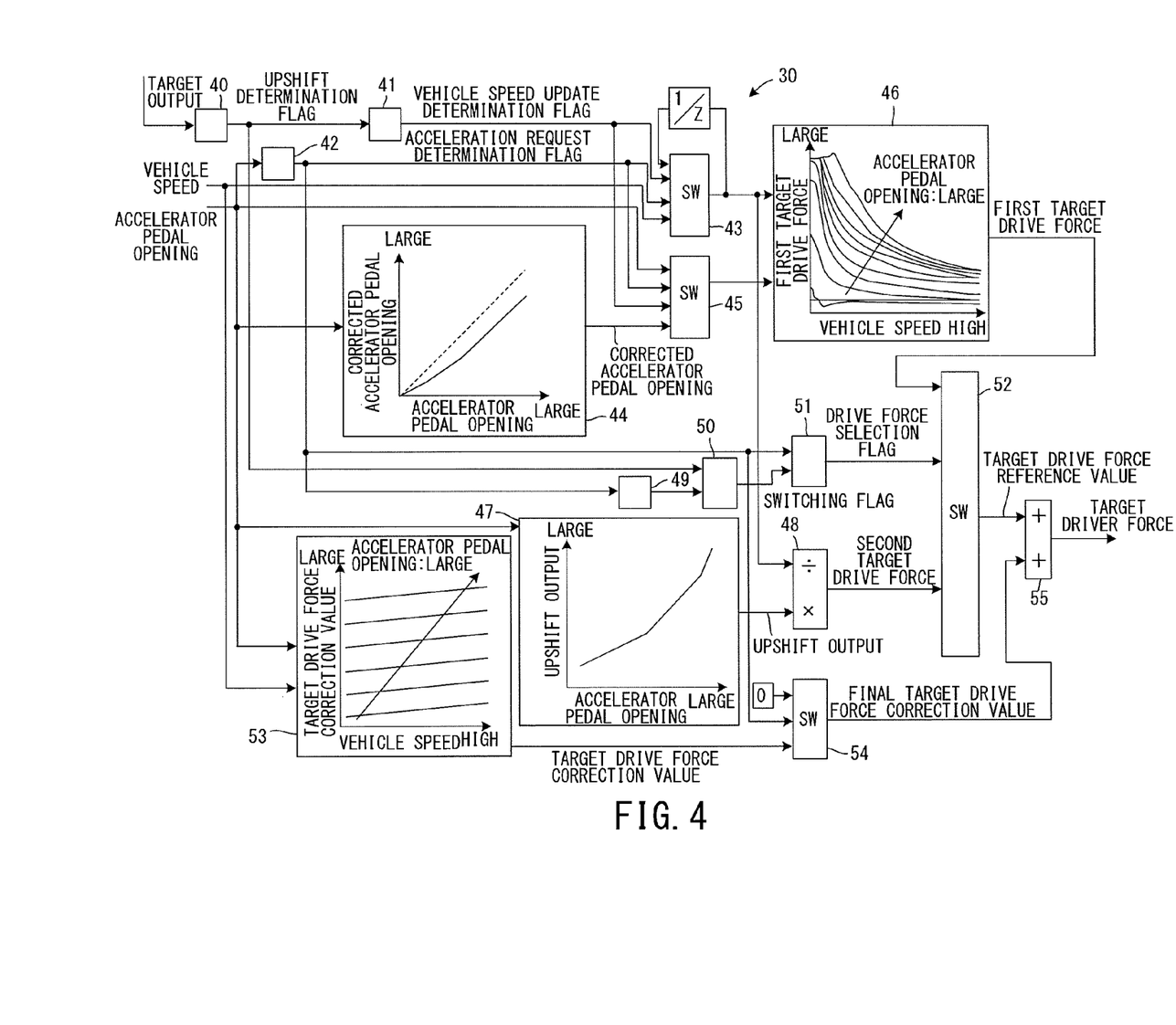
FIG. 4 is a control block diagram showing a target drive force setting unit.

Next, the target drive force setting unit 30 is described in detail using FIG. 4. FIG. 4 is a control block diagram of the target drive force setting unit 30.

An upshift determining unit 40 outputs an upshift determination flag based on the target output and an upshift determination value set in advance. The upshift determining unit 40 outputs "1" as the upshift determination flag when the target output reaches the upshift determination value and outputs "0" as the upshift determination flag in other cases. The upshift determination value is set in advance so that upshifting is performed in a fuel-efficient region along the optimal fuel consumption line shown in FIG. 3 and the vehicle travels. For example, the internal combustion engine 1 can be used in a fuel-efficient region by selecting a particularly fuel-efficient region out of the optimal fuel consumption line and setting the upshift determination value so that the vehicle travels using the selected region. The upshift determination flag is set to "1" every time the target output reaches the upshift determination value and, thereafter, set to "0" again. It should be noted that the upshift determination value is set based on the accelerator pedal opening. In this way, a timing at which upshifting is performed can be set according to the accelerator pedal opening.

A vehicle speed update determining unit 41 outputs a vehicle speed update determination flag by reversing the upshift determination flag output by the upshift determining unit 40. The vehicle speed update determination flag is "1" when the upshift determination flag is "0" and "0" when the upshift determination flag is "1".

An acceleration request determining unit 42 determines an acceleration request by a driver based on the accelerator pedal opening detected by the accelerator pedal opening sensor 22. Specifically, the acceleration request determining unit 42 determines that an acceleration request has been made when an increase amount of the accelerator pedal opening per unit time is not less than a first predetermined increase amount and outputs "1" as an acceleration request determination flag. The acceleration request determining unit 42 determines that no acceleration request has been made when the increase amount of the accelerator pedal opening per unit time is less than the first predetermined increase amount and outputs "0" as the acceleration request determination flag. After setting the acceleration request determination flag to "1", the acceleration request determining unit 42 changes the acceleration request determination flag to "0" when the increase amount of the accelerator pedal opening per unit time becomes less than a second predetermined increase amount. The second predetermined increase amount is a value smaller than the first predetermined increase amount and, for example, a negative value.

A vehicle speed selecting unit 43 selects the vehicle speed based on the acceleration request determination flag and the vehicle speed update determination flag. The vehicle speed selecting unit 43 selects the vehicle speed detected by the vehicle speed sensor 26 when the acceleration request determination flag is changed when the acceleration request determination flag is changed from "0" to "1". Thereafter, the vehicle speed selecting unit 43 holds the vehicle speed when the acceleration request determination flag is changed if the acceleration request determination flag is "1" and the vehicle speed update determination flag is "1".

The vehicle speed selecting unit 43 updates the held vehicle speed to the vehicle speed detected by the vehicle speed sensor 26 when the vehicle speed update determination flag is changed when the acceleration request determination flag is "1" and the vehicle speed update determination flag is changed from "1" to "0". Thereafter, the vehicle speed selecting unit 43 holds the updated vehicle speed if the acceleration request determination flag is "1" and the vehicle speed update determination flag "1". In this way, the vehicle speed selecting unit 43 updates the vehicle speed every time the vehicle speed update determination flag is changed from "1" to "0" and holds the updated vehicle speed thereafter if the acceleration request determination flag is "1".

The vehicle speed selecting unit 43 selects the current vehicle speed detected by the vehicle speed sensor 26 if the acceleration request determination flag is "0".

An accelerator pedal opening correcting unit 44 corrects the accelerator pedal opening detected by the accelerator pedal opening sensor 22 based on a map. The corrected accelerator pedal opening is smaller than that before correction.

An accelerator pedal opening selecting unit 45 selects the accelerator pedal opening based on the acceleration request determination flag. The accelerator pedal opening selecting unit 45 selects the corrected accelerator pedal opening until the vehicle speed update determination flag is first changed from "1" to "0" after the acceleration request determination flag is changed from "0" to "1" and selects the accelerator pedal opening detected by the accelerator pedal opening sensor 22 and not corrected in other cases.

A first target drive force setting unit 46 sets a first target drive force from a map based on the vehicle speed selected by the vehicle speed selecting unit 43 and the accelerator pedal opening selected by the accelerator pedal opening selecting unit 45.

Until the vehicle speed update determination flag is first changed from "1" to "0" after the acceleration request determination flag is changed from "0" to "1", the accelerator pedal opening selected by the accelerator pedal opening selecting unit 45 is the corrected accelerator pedal opening and the first target drive force is smaller than that set based on the uncorrected accelerator pedal opening. When a target output obtained by multiplying the first target drive force and the vehicle speed reaches the upshift determination value, first up shifting is performed after the upshift determination flag is changed from "0" to "1" and an acceleration request is made. By setting the first target drive force using the corrected accelerator pedal opening until this first upshifting is performed, the target output can be reduced, a timing of the first upshifting can be delayed and an acceleration feeling can be created as compared with the case of using the uncorrected accelerator pedal opening.

An upshift output setting unit 47 sets an upshift output from a map based on the accelerator pedal opening detected by the accelerator pedal opening sensor 22. The upshift output is so set that upshifting is performed in a fuel-efficient region along the optimal fuel consumption line of FIG. 3 and the vehicle travels. For example, by selecting a particularly fuel-efficient region out of the optimal fuel consumption line and setting the upshift output so that the vehicle travels using the selected region, the internal combustion engine 1 can be used in the fuel-efficient region. The upshift output increases as the accelerator pedal opening increases.

A second target drive force setting unit 48 sets a second target drive force by dividing the upshift output by the vehicle speed selected by the vehicle speed selecting unit 43. Since the vehicle speed is held if the acceleration request determination flag is "1" and the vehicle speed update determination flag is "1", the second target drive force is set based on the held vehicle speed and the upshift output. Further, since the vehicle speed is updated when the acceleration request determination flag is "1" and the vehicle speed update determination flag is changed from "1" to "0", the second target drive force is set based on the updated vehicle speed and the upshift output and decreases in a stepwise manner before and after the vehicle speed is updated.

An acceleration request reversing unit 49 outputs the acceleration request determination flag while reversing it. The acceleration request reversing unit 49 sets the acceleration request determination flag to "1" if the acceleration request determination flag output from the acceleration request determining unit 42 is "0" and sets the acceleration request determination flag to "0" if the acceleration request determination flag output from the acceleration request determining unit 42 is "1".

A first target drive force switching flag outputting unit 50 outputs a switching flag based on the upshift determination flag and the acceleration request determination flag reversed by the acceleration request reversing unit 49. The first target drive force switching flag outputting unit 50 outputs "0" as the switching flag if the acceleration request determination flag is "0" ("1" after reversion). The first target drive force switching flag outputting unit 50 outputs "0" as the switching flag until the upshift determination flag is first changed from "0" to "1" after the acceleration request determination flag is changed to "1" ("0" after reversion) even if the acceleration request determination flag is changed from "0" ("1" after reversion) to "1" ("0" after reversion). The first target drive force switching flag outputting unit 50 outputs "1" as the switching flag when the acceleration request determination flag is changed from "0" ("1" after reversion) to "1" ("0" after reversion) and the upshift determination flag is first changed from "0" to "1". After outputting "1" as the switching flag, the first target drive force switching flag outputting unit 50 changes the switching flag from "1" to "0" when the acceleration request determination flag is changed from "1" ("0" after reversion) to "0" ("1" after reversion).

A second target drive force switching flag outputting unit 51 outputs a drive force selection flag based on the acceleration request determination flag and the switching flag. The second target drive force switching flag outputting unit 51 outputs "1" as the drive force selection flag if the acceleration request determination flag is "0". The second target drive force switching flag outputting unit 51 outputs "0" as the drive force selection flag when the switching flag is changed from "0" to "1" after the acceleration request determination flag is set to "1". The second target drive force switching flag outputting unit 51 changes the drive force selection flag from "0" to "1" when the acceleration request determination flag is changed from "1" to "0" after "0" is output as the drive force selection flag.

A target drive force selecting unit 52 selects a target drive force reference value based on the drive force selection flag. The target drive force selecting unit 52 selects the first target drive force set by the first target drive force setting unit 46 as the target drive force reference value if the drive force selection flag is "1". The target drive force selecting unit 52 selects the second target drive force set by the second target drive force setting unit 48 as the target drive force reference value if the drive force selection flag is "0".

The target drive force selecting unit 52 sets the first target drive force set by the first target drive force setting unit 46 as the target drive force reference value until the upshift determination flag is first changed from "0" to "1" since the drive force selection flag is "1" if the acceleration request determination flag is changed "0" to "1", and sets the second target drive force set by the second target drive force setting unit 48 as the target drive force reference value since the drive force selection flag is "0" after the upshift determination flag is first set to "1". That is, the target drive force selecting unit 52 sets the first target drive force as the target drive force reference value until the first upshifting is performed even if an acceleration request is made.

A target drive force correction value setting unit 53 sets a target drive force correction value from a map based on the vehicle speed detected by the vehicle speed sensor 26 and the accelerator pedal opening. The target drive force correction value increases as the vehicle speed increases and as the accelerator pedal opening increases. The target drive force correction value is set to increase as travel resistance of the vehicle increases. Thus, sufficient acceleration performance can be obtained by correcting the target drive force reference value by the correction value even in an operating state where the travel resistance increases.

A target drive force correction selecting unit 54 selects a final target drive force correction value based on the acceleration request determination flag. The target drive force correction selecting unit 54 selects zero as the final target drive force correction value if the acceleration request determination flag is "0". The target drive force correction selecting unit 54 selects the target drive force correction value as the final target drive force correction value if the acceleration request determination flag is "1".

A final target drive force setting unit 55 sets the target drive force by adding the target drive force reference value and the final target drive force correction value. If the acceleration request determination flag is "0", the target drive force reference value becomes the target drive force since the final target drive force correction value is zero.

The target drive force setting unit 30 sets the target drive force in the above way.

Figure 5:
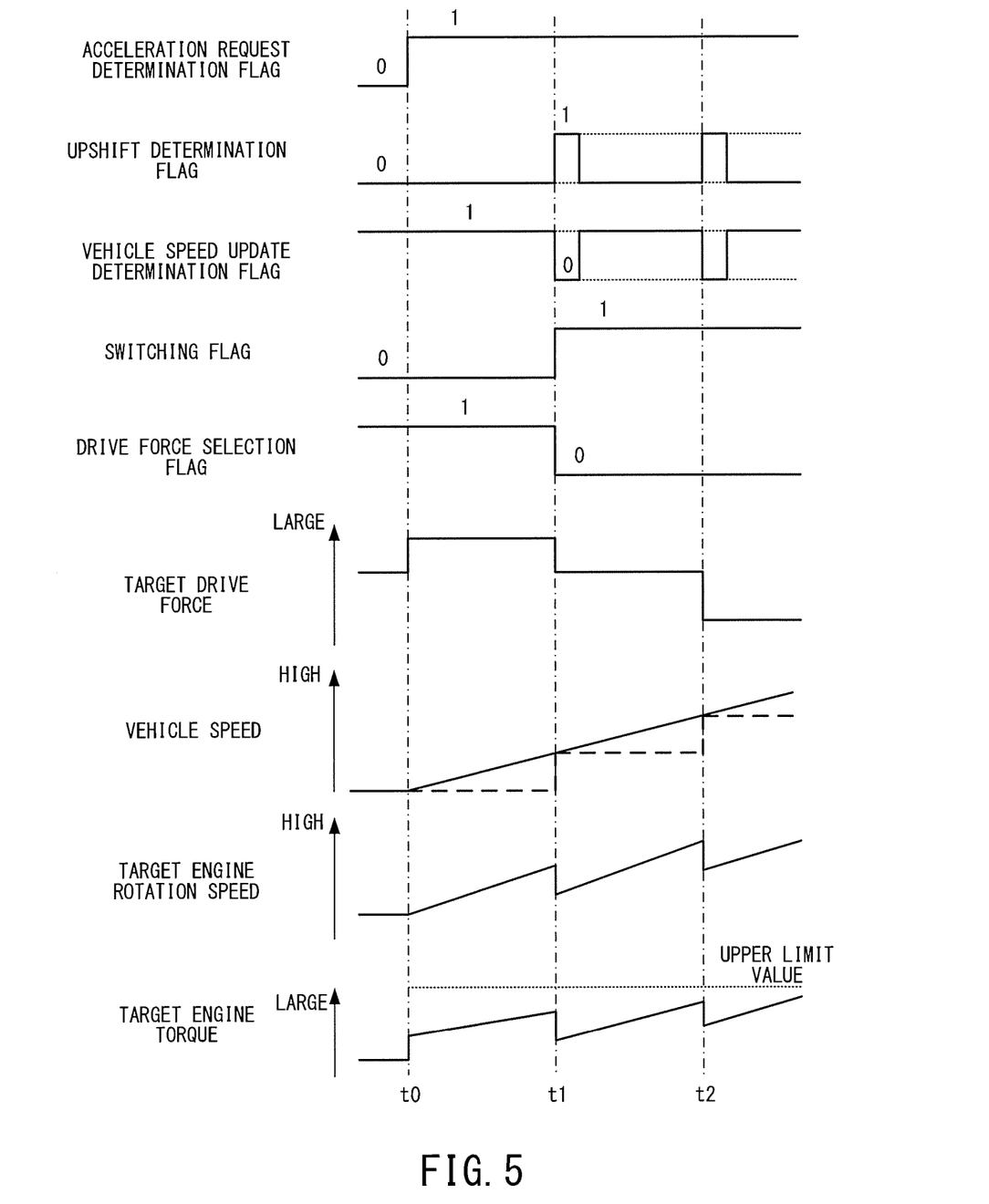
FIG. 5 is a time chart showing changes in a target drive force and the like in the embodiment.

Next, changes in the target drive force and the like in the present embodiment are described using a time chart of FIG. 5. It should be noted that the accelerator pedal opening is assumed to be kept constant.

At time t0, the acceleration request determination flag is changed from "0" to "1" when the driver depresses the accelerator pedal 7 and the increase amount of the accelerator pedal opening per unit time becomes more than the first predetermined increase amount. This causes the vehicle speed selecting unit 43 to select the vehicle speed detected by the vehicle speed sensor 26 when the acceleration request determination flag is changed and hold that vehicle speed thereafter. Thus, even if an actual vehicle speed (solid line in FIG. 5) increases, the vehicle speed for setting the target drive force (broken line in FIG. 5) is constant. Since the upshift determination flag is "0", the switching flag is "0" and the drive force selection flag is "1". Thus, the first target drive force set by the first target drive force setting unit 46 becomes the target drive force reference value and the sum of the target drive force reference value and the target drive force correction value becomes the target drive force. Since the accelerator pedal opening is constant and the vehicle speed for setting the target drive force is held, the target drive force is constant.

However, since the target output is set by multiplying the target drive force and the actual vehicle speed, the target engine rotation speed and the target engine torque set based on the target output increase.

At time t1, the upshift determination flag is changed from "0" to "1" when the target output reaches the upshift determination value. This causes the vehicle speed update determination flag to be changed from "1" to "0" and causes the vehicle speed selecting unit 43 to update the held vehicle speed to the vehicle speed detected by the vehicle speed sensor 26 when the vehicle speed update determination flag is changed to "0". Further, since the switching flag is changed from "0" to "1", the drive force selection flag is changed from "1" to "0" and the second target drive force set by the second target drive force setting unit 48 becomes the target drive force reference value. Since the vehicle speed for setting the second target drive force is updated, the target drive force reference value decreases in a stepwise manner, the target drive force decreases in a stepwise manner, the target engine rotation speed decreases and upshifting is performed. In the present embodiment, an increase of the target engine torque up to an upper limit value can be suppressed since the target engine torque is decreased by a stepwise decrease of the target drive force. Thereafter, the target output increases as the actual vehicle speed increases, wherefore the target engine rotation speed and the target engine torque increase.

At time t2, the vehicle speed for setting the second target drive force is updated when the actual vehicle speed increases and the target output reaches the upshift determination value. Thus, the target drive force reference value decreases in a stepwise manner and the target drive force decreases in a stepwise manner.

Next, effects of the present embodiment are described.

In the vehicle in which the speed ratio of the continuously variable transmission 12 and the engine torque of the internal combustion engine 1 are set based on the target drive force, there are cases where the engine torque reaches an upper limit value due to an increase of the engine torque corresponding to a reduction of the engine rotation speed reduced by upshifting and the engine torque cannot be actually increased when an acceleration request is made and upshifting is to be performed.

In the present embodiment, the target drive force decreases in a stepwise manner when an acceleration request is made and upshifting is to be performed, whereby it is possible to suppress an increase of the engine torque to the upper limit value, suppress an engine torque shortage, suppress a drop of the actual drive force below the target drive force and improve drivability.

In the present embodiment, when an acceleration request is made, a reduction of the target drive force according to the vehicle speed can be suppressed and acceleration performance of the vehicle can be improved by holding the vehicle speed for setting the first target drive force at the vehicle speed when the acceleration request is made.

In the present embodiment, when the target output reaches the upshift determination value, the target drive force is decreased in a stepwise manner and upshifting is performed by updating the vehicle speed for setting the target drive force. In the present embodiment, the target engine rotation speed is set based on the target output by the target output setting unit 31 and the target engine rotation speed at the time of upshifting can be stabilized by setting a timing of upshifting based on the target output. If the timing of upshifting is not set based on the target output without using the present embodiment, the target output at the time of upshifting is not stabilized and a variation of the target engine rotation speed at the time of upshifting becomes large and a sense of incongruity may be given to the driver. In the present embodiment, such a sense of incongruity can be suppressed.

Further, by performing upshifting when the target output reaches the upshift determination value set based on the optimal fuel consumption line, upshifting can be performed in the fuel-efficient region along the optimal fuel consumption line and the vehicle can be caused to travel.

By setting the timing of upshifting based on the target output, an upshift determination can be made earlier than in the case of a determination based on an actual output and a delay in upshifting can be suppressed.

By setting the target drive force after upshifting based on the upshift output set based on the optimal fuel consumption line, upshifting can be performed in the fuel-efficient region along the optimal fuel consumption line and the vehicle can be caused to travel.

By setting the target drive force correction value based on the vehicle speed and the accelerator pedal opening and setting the target drive force by adding the target drive force correction value to the target drive force reference value, the target drive force can be set in accordance with the operating state of the vehicle after upshifting and an operation intended by the driver can be performed. For example, if the driver largely depresses the accelerator pedal 7, the vehicle can be quickly accelerated according to a depressed amount of the accelerator pedal 7 by increasing the target drive force. Further, if the accelerator pedal 7 is depressed to a small extent, the vehicle can be slowly accelerated according to the depressed amount of the accelerator pedal 7 by reducing the target drive force.

By increasing the target drive force correction value at a high vehicle speed at which travel resistance of the vehicle is large, the target drive force can be increased and acceleration performance of the vehicle can be improved.

Although the embodiment of the present invention has been described above, the above embodiment is merely an application example of the present invention and not of the nature to limit the technical scope of the prevent invention to the specific configuration of the above embodiment.

The continuously variable transmission 12 described above may be installed in a hybrid vehicle and a motor may function as a drive source.

The present application claims a priority of Japanese Patent Application No. 2012-205879 filed with the Japan Patent Office on Sep. 19, 2012, all the contents of which are hereby incorporated by reference.

The invention claimed is:

1. A vehicle control device, comprising:
   a target drive force setting unit configured to set a target drive force based on an operating state;
   a target speed ratio setting unit configured to set a target speed ratio of a continuously variable transmission to achieve the target drive force; and
   a target torque setting unit configured to set a target torque of a drive source to achieve the target drive force,
   the target drive force setting unit setting the target drive force reduced in a stepwise manner at the time of upshifting in the continuously variable transmission and holding the reduced target drive force.

2. The vehicle control device according to claim 1, comprising:
   a vehicle speed detecting unit configured to detect a vehicle speed;
   an accelerator pedal opening detecting unit configured to detect an accelerator pedal opening;

an acceleration request determining unit configured to determine based on the accelerator pedal opening whether or not an acceleration request has been made; and a vehicle speed holding unit configured to hold a vehicle speed when the acceleration request is made as a vehicle speed for setting the target drive force when the acceleration request is made.

3. The vehicle control device according to claim 2, comprising:

a target output setting unit configured to set a target output based on the target drive force and a current vehicle speed; and a vehicle speed updating unit configured to update the vehicle speed for setting the target drive force from the held vehicle speed to a vehicle speed when the target output reaches a predetermined output when the target output reaches the predetermined output, wherein the target drive force setting unit is configured to set the target drive force based on the updated vehicle speed and the accelerator pedal opening.

4. The vehicle control device according to claim 2, comprising:

an upshift output setting unit configured to set an upshift output based on the accelerator pedal opening when the acceleration request is made and the upshifting is to be performed, wherein the target drive force setting unit is configured to set the target drive force based on the upshift output when the acceleration request is made and the upshifting is to be performed.

5. The vehicle control device according to claim 2, comprising:

a target drive force correcting unit configured to set a target drive force correction value for correcting the target drive force based on a current vehicle speed and the accelerator pedal opening.

6. The vehicle control device according to claim 5, wherein:

the target drive force correction value increases as travel resistance increases.

7. A vehicle control method, comprising:

setting a target drive force based on an operating state;

setting a target speed ratio of a continuously variable transmission to achieve the target drive force; and setting a target torque of a drive source to achieve the target drive force, the target drive force being reduced in a stepwise manner at the time of upshifting in the continuously variable transmission and held at a reduced value.

8. A vehicle control device, comprising:

a target drive force setting unit configured to set a target drive force based on an operating state;

a target speed ratio setting unit configured to set a target speed ratio of a continuously variable transmission to realize the target drive force;

a target torque setting unit configured to set a target torque of a drive source to achieve the target drive force;

a vehicle speed detecting unit v detect a vehicle speed;

an accelerator pedal opening detecting unit configured to detect an accelerator pedal opening;

an acceleration request determining unit configured to determine based on the accelerator pedal opening whether or not an acceleration request has been made; and a vehicle speed holding unit configured to hold a vehicle speed when the acceleration request is made as a vehicle speed for setting the target drive force when the acceleration request is made, the target drive force setting unit setting a target drive force reduced in a stepwise manner at the time of upshifting in the continuously variable transmission.

9. The vehicle control device according to claim 8, comprising:

a target output setting unit configured to set a target output based on the target drive force and a current vehicle speed; and a vehicle speed updating unit configured to update the vehicle speed for setting the target drive force from the held vehicle speed to a vehicle speed when the target output reaches a predetermined output when the target output reaches the predetermined output, wherein the target drive force setting unit is configured to set the target drive force based on the updated vehicle speed and the accelerator pedal opening.

10. The vehicle control device according to claim 8, comprising:

an upshift output setting unit configured to set an upshift output based on the accelerator pedal opening when the acceleration request is made and the upshifting is to be performed, wherein the target drive force setting unit is configured to set the target drive force based on the upshift output when the acceleration request is made and the upshifting is to be performed.

11. The vehicle control device according to claim 8, comprising:

a target drive force correcting unit configured to set a target drive force correction value for correcting the target drive force based on a current vehicle speed and the accelerator pedal opening.

12. The vehicle control device according to claim 11, wherein:

the target drive force correction value increases as travel resistance increases.

13. A vehicle control method, comprising:

setting a target drive force based on an operating state;

setting a target speed ratio of a continuously variable transmission to achieve the target drive force;

setting a target torque of a drive source to achieve the target drive force;

detecting a vehicle speed;

detecting an accelerator pedal opening;

determining based on the accelerator pedal opening whether or not an acceleration request has been made; and holding a vehicle speed when the acceleration request is made as a vehicle speed for setting the target drive force when the acceleration request is made, the target drive force being reduced in a stepwise manner at the time of upshifting in the continuously variable transmission.

* * * * *